UNITED STATES PATENT OFFICE.

ANTHONY L. FLEURY, OF PITTSBURG, PENNSYLVANIA.

IMPROVEMENT IN THE MANUFACTURE OF ARTIFICIAL NON-INFLAMMABLE WOOD.

Specification forming part of Letters Patent No. 52,553, dated February 13, 1866.

*To all whom it may concern:*

Be it known that I, ANTHONY L. FLEURY, of the city of Pittsburg, Allegheny county, State of Pennsylvania, have invented a new and useful Process for Manufacturing Artificial Non-Inflammable Wood; and I do hereby declare that the following is a clear and exact description of the same.

The nature of my invention consists in compounding and treating fibrous materials with vegetable or animal albumen, a soluble silicate and sulphuric acid, or a sulphate, in the way and for the purposes here below more fully specified.

The frequent conflagrations by fire, propagated in nearly every instance by the inflammability of wood, the frequent accidents on railroads, where the splinters of wood have caused so much suffering, make us deeply feel the want of a proper substitute for wood, such as could be procured at a comparative cheap price, and one that was not liable to form splinters.

In my invention I have attempted to supply this want.

The here-below described artificial non-inflammable wood has the following properties and advantages: It is cheap and easily obtained, also is manufactured without much trouble and expense. It is stronger than ordinary wood, does not splinter, is not subject to decay or worms, can withstand the action of most acids, salts, or moisture, is not acted upon by light, gas, oil, or water, is a non-conductor of heat and electricity, is non-inflammable, and withstands cold without freezing. These qualities make it applicable for building ships and boats, lining of iron vessels, for the construction of portable houses for miners and immigrants, for stables, cottages, and architectural ornaments, for railroad and street cars, carriages of all kinds, roofs and floors, tanks, barrels, and tubes for gas, oil, and other liquids, furniture, patterns and molds, parts of machinery, stands, frames, handles, telegraphic and photographic instruments, and plates, boxes, boot and shoe soles, skates, and a variety of other useful and ornamental articles.

To enable others skilled in the arts to make use of my invention, I will now proceed to describe the process.

The apparatus and machinery used for similar purposes are well known. I therefore do not think it necessary to illustrate it by drawings and models.

Space does not allow me to detail all the various modifications my process may be worked with. Those skilled in the art can, without further details, by the knowledge of the principles here explained, work my process with all success and for the various purposes mentioned.

I first procure a cheap fibrous material—such, for instance, as paper, paper-pulp, paper-parchment, corn-husks, sorghum or sugar-cane, (after separation of their juice,) sea or prairie grass, needles of pine or other trees, sawdust, spent tan-bark—in short, any material that yields a strong pulp.

I place the selected material into a vat or other receptacle, and gradually add and stir into it a solution of glue, vegetable or animal albumen—such as beaten blood, starch, paste, or fish-glue, to which previously a suitable quantity of a soluble silicate has been added—until a thick homogeneous paste results. I then add to this mixture, slowly and under continuous stirring, a diluted solution of a soluble sulphate or sulphuric acid. The silicic acid becomes thereby free, the alkali of the silicate is taken up by the sulphuric acid, and as the silica is in *statu nascendi*, and finds in the albumen a material to combine with, it forms a non-inflammable cement that keeps the fibrous material in close and durable union, when the material, after the resulting sulphate salt has been drawn off, is compressed in suitable molds under a hydraulic press, or is rolled out under heavy and heated rollers to sheets or other desirable shape.

What I claim as my invention, and desire to secure by Letters Patent, is—

1. Treating fibrous materials in the way and for the purposes above specified.

2. The improved material, which I denominate "artificial non-inflammable wood," the same being produced by the process above described, or by a substantially equivalent process.

A. L. FLEURY.

Witnesses:
BARNARD ELLIS,
WM. J. CAMPBELL.